(12) United States Patent
Gabathuler

(10) Patent No.: US 8,978,885 B2
(45) Date of Patent: Mar. 17, 2015

(54) SYSTEM AND METHOD FOR EXCHANGING A BATTERY OF A HEARING DEVICE

(75) Inventor: Bruno Gabathuler, Gruningen (CH)

(73) Assignee: Phonak AG, Stafa (CH)

( * ) Notice: Subject to any disclaimer, the term of this patent is extended or adjusted under 35 U.S.C. 154(b) by 422 days.

(21) Appl. No.: 13/577,682

(22) PCT Filed: Feb. 11, 2010

(86) PCT No.: PCT/EP2010/051738
§ 371 (c)(1),
(2), (4) Date: Aug. 8, 2012

(87) PCT Pub. No.: WO2010/052345
PCT Pub. Date: May 14, 2010

(65) Prior Publication Data
US 2012/0312833 A1    Dec. 13, 2012

(51) Int. Cl.
*B65D 85/00*    (2006.01)
*H01M 2/10*    (2006.01)
*H04R 25/00*    (2006.01)

(52) U.S. Cl.
CPC ........... *H01M 2/1038* (2013.01); *H04R 25/602* (2013.01); *H04R 2460/17* (2013.01)
USPC ........... 206/320; 206/704; 221/102; 221/113; 221/121; 221/270

(58) Field of Classification Search
USPC ......... 206/320, 576, 701, 703, 704, 722, 724; 221/102, 97, 113, 119, 121, 87, 88, 221/270, 271
See application file for complete search history.

(56) References Cited

U.S. PATENT DOCUMENTS

| | | | |
|---|---|---|---|
| 3,633,792 A | 1/1972 | Steigerwald | |
| 4,860,890 A | 8/1989 | Cerny et al. | |
| 5,117,977 A | 6/1992 | Voroba | |
| 5,199,565 A | 4/1993 | Voroba | |
| 5,651,821 A * | 7/1997 | Uchida | 118/200 |
| 6,039,185 A | 3/2000 | Pedracine et al. | |
| 6,546,108 B1 * | 4/2003 | Shennib et al. | 381/322 |

(Continued)

FOREIGN PATENT DOCUMENTS

WO    93/07988 A1    4/1993
WO    2006/049988 A1    5/2006

OTHER PUBLICATIONS

International Search Report for PCT/EP2010/051738 dated Apr. 28, 2010.

(Continued)

*Primary Examiner* — Jacob K Ackun
(74) *Attorney, Agent, or Firm* — Pearne & Gordon LLP

(57) ABSTRACT

The present invention provides a system that allows an easy and quick exchange of small batteries of hearing devices as well as a method for exchanging a battery of a hearing device that combines the installation of a new battery into the hearing device with the deinstallation of the battery to be replaced from the hearing device in a single action using a single mechanism. The inventive battery exchange system comprises a carrier module 1, which features a hearing device receiving means shaped to receive a part of a hearing device 4 and a battery passage that traverses the carrier module 1, a battery dispensing module 2 adapted to accommodate at least one battery 7 and a battery ejection means 3 adapted to eject a battery 7 from the battery dispensing module 2 into the battery passage of the carrier module 1.

31 Claims, 4 Drawing Sheets

(56) References Cited

U.S. PATENT DOCUMENTS

| | | |
|---|---|---|
| 6,581,799 B1 | 6/2003 | Garrant et al. |
| 2005/0179274 A1 | 8/2005 | Lera |
| 2006/0118572 A1* | 6/2006 | Ferguson et al. ............... 221/76 |
| 2009/0020549 A1 | 1/2009 | Lyndegaard et al. |

OTHER PUBLICATIONS

Written Opinion for PCT/EP2010/051738 dated Apr. 28, 2010.

* cited by examiner

SYSTEM AND METHOD FOR EXCHANGING A BATTERY OF A HEARING DEVICE

FIELD OF THE INVENTION

The present invention pertains to a system for exchanging a battery of a hearing device as well as to a method for exchanging a battery of a hearing device.

BACKGROUND OF THE INVENTION

Hearing devices are often very small so that they can be worn at the pinna or in the ear canal. As a consequence a single miniature cell such as for example a zinc-air battery or rechargeable NiMH battery is employed to power these devices. Such tiny batteries only have a rather limited capacity, e.g. a size 13 battery with a diameter of 7.9 mm and a height of 5.4 mm has a typical capacity of 310 mAh. Therefore, they usually need to be replaced quite often, for instance every few days in the case of a hearing aid being used many hours per day by a hearing impaired person. The handling of such tiny batteries when trying to replace a depleted battery of a small hearing device with a full one is especially challenging and time consuming for elderly people who have lost their manual dexterity and possess reduced vision, as commonly occurs with ageing. Furthermore, individuals of the older age group prefer simple things that are easy to use. Due to the frequent requirement for battery replacement this task practically cannot be assumed by a more capable person (e.g. a caregiver or a hearing aid dispenser) but needs to be accomplishable by the user of the device him-/herself.

A number of solutions exist that attempt to make the process of exchanging the battery of a hearing device a less tedious task.

An apparatus that eases the process of inserting such batteries into small electrical devices is described in U.S. Pat. No. 4,860,890. The apparatus includes a plurality of handles, where a small battery is removably attached to the end of each handle, allowing the use of the handle for assisting with the insertion of the battery into a small battery well.

U.S. Pat. No. 6,039,185 also discloses a hearing aid battery inserter. Using this inserter a single battery may be conveniently inserted into a hearing aid while still attached to the inserter. By gripping the inserter between the thumb and forefinger, a single battery may readily be positioned adjacent the battery compartment of a hearing aid, inserted within the battery compartment, and then separated from the inserter by a sliding or wiping motion.

In US-A-2005/0179274 a pair of tweezers adapted for inserting hearing aid batteries is presented.

Furthermore, WO-A-93/07988 elaborates on a pen-like battery handling apparatus with a magnetic pickup.

Similarly, US-A-2009/0020549 proposes a pen-shaped battery dispenser and a cartridge for dispensing batteries to a hearing aid, wherein an ejector member ejects a battery from the battery dispenser following activation of a release member.

In U.S. Pat. No. 5,117,977 a device which dispenses and provides insertion and removal capability for individually installing and deinstalling batteries for in-the-ear or in-the-canal type hearing aids is described. A multi-battery dispensing container is proposed that is reusable and stores the removed batteries within the container for recycling or proper disposal. The device comprises a series of chambers, where each chamber is configured to perform either the function of removing a battery from a host electronic device or the function of installing a new battery into a host electronic device.

Additionally, further refinements of the device presented in U.S. Pat. No. 5,117,977 are described in U.S. Pat. No. 5,199,565.

SUMMARY OF THE INVENTION

The present invention seeks to provide an improved system, especially with respect to the prior art disclosed in the latter two documents U.S. Pat. Nos. 5,117,977 and 5,199,565, for exchanging the battery of a hearing device, especially of the behind-the-ear type, and thus to further facilitate the process of exchanging the battery of a hearing device.

It is an object of the present invention to provide a system that allows an easy and quick insertion and removal of small batteries into and from hearing devices.

It is further an object of the present invention to provide a system for exchanging the battery of a hearing device that allows removing a depleted battery at the same time as a new battery is inserted. Correspondingly, it is also an object of the present invention to provide a method for exchanging a battery of a hearing device wherein removing a depleted battery and inserting a new battery is performed in a single step.

These objects of the present invention are achieved in particular by means of the features of the independent apparatus claim 1 and by the steps of the independent method claim 30, respectively. Further embodiments of the present invention are disclosed in the dependent claims and elaborated upon in the following description.

According to the present invention a battery exchange system for hearing devices is provided comprising:
- a carrier module featuring a hearing device receiving means shaped to receive a part of a hearing device, wherein the part of the hearing device to be received by the hearing device receiving means at least comprises a battery receiving means, the carrier module further featuring a battery passage, which traverses the carrier module from a first opening at a first lateral surface to a second opening at a second lateral surface, the second lateral surface being opposite to the first lateral surface, the battery passage of the carrier module being arranged such that it intersects with the hearing device receiving means;
- a battery dispensing module adapted to accommodate at least one battery, the battery dispensing module featuring a battery holding means adapted for releasably holding a battery in or at the battery dispensing module, wherein the battery dispensing module is connected with the carrier module such that the battery holding means is aligned or alignable with the battery passage of the carrier module; and
- a battery ejection means adapted to eject a battery from the battery dispensing module into the battery passage of the carrier module.

Correspondingly, a method for exchanging a battery of a hearing device is provided, where the inventive method comprises the steps of:
  i. inserting a hearing device retaining a battery to be replaced in a battery receiving means of the hearing device into a hearing device receiving means of a carrier module of a battery exchange system;
  ii. activating a battery ejection means of the battery exchange system, whereby the battery ejection means ejects a replacement battery from a battery dispensing module attached to the carrier module into a battery passage that traverses the carrier module and intersects with the hearing device receiving means, and whereby the replacement battery is ejected into a part of the battery passage of the carrier module where the battery passage intersects with the hearing device receiving means such that the replacement battery is inserted into the battery receiving means of the hearing device, thereby dislodging the battery to be replaced from the battery receiving means of the hearing device and pushing the battery to be replaced out of the carrier module, thus removing the battery to be exchanged from the battery exchange system; and iii. removing the hearing device from the hearing device receiving means.

Hence, the present invention combines the installation of a new battery into the hearing device with the deinstallation of the battery to be replaced from the hearing device in a single action using a single mechanism and thus significantly simplifies and speeds up the battery replacement process relative to what was achievable using prior art solutions.

In another embodiment of the present invention the battery dispensing module is removably attachable to the carrier module. This provides a modular solution to the battery exchange system where an empty battery dispensing module can be replaced by a new one loaded with batteries, instead of having to reload a battery dispensing module which is fixedly attached to the carrier module with new batteries. Additionally, with such a modular system for instance a more elaborate and costly solution can be provided for the carrier module, e.g. provided by the hearing device manufacturer, and a cheap, single-use, i.e. disposable solution can be provided for the battery dispensing module, e.g. provided by different battery vendors.

In another embodiment of the present invention the battery dispensing module comprises a housing featuring a battery outlet and a further opening, wherein the housing is connected or connectable to the carrier module such that the battery outlet is aligned with the battery passage of the carrier module, and wherein the further opening is located on an exterior surface of the housing opposite to the battery outlet, whereby the further opening and the battery outlet form opposite ends of a battery passage that traverses the battery dispensing module. This allows ejection of the batteries contained in the housing of the battery dispensing module into the battery passage of the carrier module via the battery outlet by introducing the battery ejection means into the opening on the exterior surface of the housing. Such a battery ejection means can comprise a push member which is shaped to be insertable into the opening on the exterior surface of the housing and which is extendable through the battery passage of the battery dispensing module for instance at least up to the battery outlet.

In an aspect of the present invention the push member is longitudinally movable within a tube from a retracted position to an extended position, wherein the tube is attached to the housing of the battery dispensing module and aligned with the opening on the exterior surface of the housing such that the push member is extendable through the battery passage of the battery dispensing module for instance at least up to the battery outlet. Furthermore, a biasing means can be provided in the tube for urging the push member toward the retracted position. This allows facilitating the process of ejecting a battery from the battery dispensing module into the battery passage of the carrier module even more.

In another aspect of the present invention the battery holding means comprises a clasp or a clamp adapted to exert a gripping force on a battery. Alternatively, the battery holding means can comprise an adhesive or magnetic tab, respectively, where a battery is attachable to the tab by means of a pressure sensitive adhesive layer applied to the tab or by means of a magnetic element provided at the tab, respectively. Both solutions can be employed separately or in combination. Since adhesive "air tabs" are employed to protect zinc-air batteries from being activated before they are installed into a hearing device, the mentioned adhesive tab is well suited to be used both as battery holding means as well as air tab.

In yet another aspect of the present invention the push member features a separation means adapted for detaching the attachable battery from the tab such that the tab is retainable in the battery dispensing module. Such a separation means can comprise a groove extending along at least a portion of the push member intended for insertion into the battery passage of the battery dispensing module, wherein the profile of the groove is shaped essentially the same as and sized at least as large as a part of the tab where a battery is attachable. Again, using such a configuration in connection with zinc-air batteries is especially attractive since the air tab that simultaneously protects and holds the battery is automatically removed when inserting the battery into the hearing device without the need for any handling of the air tab by the user.

In a further embodiment of the present invention the battery dispensing module comprises a multi-battery cartridge rotatably mounted on the carrier module or within the housing of the battery dispensing module, the multi-battery cartridge being adapted to retain a plurality of batteries. The multi-battery cartridge can comprise a disk featuring a plurality of battery holding means arranged along the perimeter, wherein rotation of the disk successively brings each of the battery holding means into alignment with the battery passage of the carrier module. Alternatively, the multi-battery cartridge can comprise a barrel featuring a plurality of battery retaining means each shaped to receive a battery, the plurality of battery retaining means being arranged along the circumference of the barrel, wherein rotation of the barrel successively brings each of the battery retaining means into alignment with the battery passage of the carrier module.

In further elaborations of the last-mentioned embodiments the multi-battery cartridge comprises cooperating detent means associated with the carrier module or the housing of the battery dispensing module adapted for holding in alignment any one of the plurality of battery retaining means or the plurality of battery holding means with the battery passage of the carrier module.

In yet further elaborations of the last-mentioned embodiments the multi-battery cartridge comprises a stop return means adapted for interaction with the carrier module or the housing of the battery dispensing module such that the multi-battery cartridge is prevented from substantially rotating in one direction.

In yet another embodiment of the present invention the battery exchange system features a multi-battery cartridge rotation means adapted to rotate the multi-battery cartridge(s) upon insertion of a hearing device into the hearing device receiving means in order to bring the next battery into alignment with the cylindrical battery passage of the carrier module.

It is a further object of the present invention to provide a system for exchanging the battery of a hearing device that requires neither any direct handling of batteries nor any delicate manipulations at the hearing device by the user in order to exchange an old battery with a new one.

This object is achieved by an embodiment of the present invention where the battery exchange system comprises an opening means adapted for engaging with a hearing device receivable by the hearing device receiving means such that the battery receiving means of the hearing device is made accessible for exchanging a battery via the passage of the carrier module. The opening means can for instance comprise a guide channel arranged at the carrier module and shaped to receive a corresponding guide member associated with the battery receiving means of the hearing device receivable by the hearing device receiving means, wherein the course of the guide channel is adapted to generate a movement of the guide member such that the battery receiving means of the hearing device is made accessible for exchanging a battery via the passage of the carrier module. Alternatively, the opening means can for example comprise an actuator arranged at the multi-battery cartridge and adapted to perform a movement in conjunction with a rotation of the multi-battery cartridge, wherein the movement is such that the actuator engages with a hearing device receivable by the hearing device receiving means, whereupon the battery receiving means of the hearing device is made accessible for exchanging a battery via the passage of the carrier module.

Correspondingly, a further elaboration of the above-mentioned inventive method for exchanging a battery of a hearing device is provided, wherein prior to step ii of the above-mentioned inventive method an opening means of the battery exchange system engages with the hearing device inserted or being inserted into the hearing device receiving means such that the battery receiving means of the hearing device is made accessible for exchanging the battery via the battery passage of the carrier module. The action of making accessible the battery receiving means of the hearing device, e.g. of opening the battery compartment of the hearing device, can for instance take place whilst inserting the hearing device into the hearing device receiving means, e.g. whilst the guide member moves along the course of the guide channel. Alternatively, the action of making accessible the battery receiving means of the hearing device can for example take place in conjunction with a rotation of the multi-battery cartridge, e.g. in order to align a new battery with the battery outlet. Thereby, the actuator arranged at the multi-battery cartridge for instance engages with a ridge at the battery compartment door or port, respectively, of the hearing device and swings the battery compartment out of the hearing device or slides open the battery compartment port, respectively, thus making the battery accessible for exchange.

In yet a further embodiment of the present invention the battery exchange system comprises a battery disposing module adapted to accommodate at least one battery, the battery disposing module featuring a battery inlet, wherein the battery disposing module is attached to the carrier module such that the battery inlet is aligned with the battery passage of the carrier module. With such an arrangement multiple depleted batteries can be conveniently stored in the battery disposing module until they can be safely discarded or provided for recycling. The battery disposing module can be removably attachable to the carrier module.

In yet another embodiment of the invention the construction of the battery disposing module is identical to the construction of the battery dispensing module. Hence, only a single type of "battery module" needs to be manufactured, which reduces costs over a solution with two different modules.

In a specific embodiment of the invention the battery exchange system comprises a battery disposing module adapted to accommodate at least one battery, the battery disposing module featuring a battery inlet, wherein the battery disposing module is removably attachable to the carrier module and the battery inlet is aligned with the battery passage of the carrier module, and wherein the construction of the battery disposing module is identical to the construction of the battery dispensing module, and wherein the multi-battery cartridge related to the battery dispensing module is rotatably coupled to the multi-battery cartridge related to the battery disposing module by coupling means adapted to provide lock-step rotatability of the two multi-battery cartridges.

In a further embodiment of the present invention the battery disposing module comprises a charging circuit for charging rechargeable batteries. This allows recharging of depleted batteries without needing to remove them from the battery disposing module. Power can for instance be provided to the charging circuit from a power line, a car battery or a power generator such as a solar cell.

In yet another embodiment of the present invention the battery disposing module comprises a charger battery as power source for charging depleted rechargeable batteries via the charging circuit. This makes the battery exchange system independent of a connection to an external power source such as a power line for a prolonged period of time. The charger battery itself can in turn be recharged from an external power supply.

With an embodiment of the present invention that includes the previously mentioned recharging capability and where the construction of the battery disposing module is identical to that of the battery dispensing module (we can therefore refer to either of them merely as "battery module"), rechargeable batteries can be reused with the inventive battery exchange system many times over without ever having to handle them directly, but instead only the more manageable battery modules. This can be done by exchanging the empty battery module on the "dispensing side" with a battery module full of recharged batteries from the "disposing side" and vice-versa. Alternatively, instead of physically swapping the two battery modules, they can remain where they are and merely change their purpose, i.e. the battery dispensing module becomes the battery disposing module and vice-versa, so a depleted battery is recharged in the battery module it was disposed into and then reinserted into the hearing device from this battery module from whichever side of the carrier module that this battery module is attached to.

In another aspect of the present invention the hearing device receiving means is shaped to receive a part of a specific hearing device model. Alternatively, the hearing device receiving means can be shaped according to certain features of an individual's ear, e.g. so as to be able to receive a part of the individual's individually shaped hearing device.

In a further embodiment of the present invention the carrier module comprises two half-shells. They can be fixedly or releasably joined to form the carrier module, e.g. to facilitate cleaning or repairing of the carrier module. These two half-shells can be obtained by means of injection moulding. Such an embodiment is cost-efficient and simple to manufacture and assemble.

The carrier module can also be obtained using a rapid prototyping process such as for instance selective laser sintering, stereolithography, photopolymerization, fused deposition modelling or 3D printing. This is attractive when the hearing device receiving means is to be shaped according to certain features of an individual's ear. Photopolymerization can for instance be based on mask projection using for example digital light processing technology.

In yet another embodiment of the present invention the carrier module features two hearing device receiving means, wherein one hearing device receiving means is shaped to receive a part of a hearing device specifically shaped to be worn at or in the left ear and the other hearing device receiving means is shaped to receive a part of a hearing device specifically shaped to be worn at or in the right ear.

It is expressly pointed out that any combination of the above-mentioned or hereinafter described embodiments is feasible. Of course, those combinations of embodiments that would result in contradictions are excluded.

Features of the present invention will become apparent to those skilled in the art upon consideration of the subsequent detailed description of exemplary embodiments.

BRIEF DESCRIPTION OF THE DRAWINGS

In the following the invention shall be further described in detail with the aid of examples and in relation to the attached figures, wherein.

DETAILED DESCRIPTION OF THE INVENTION

Figure 1A:
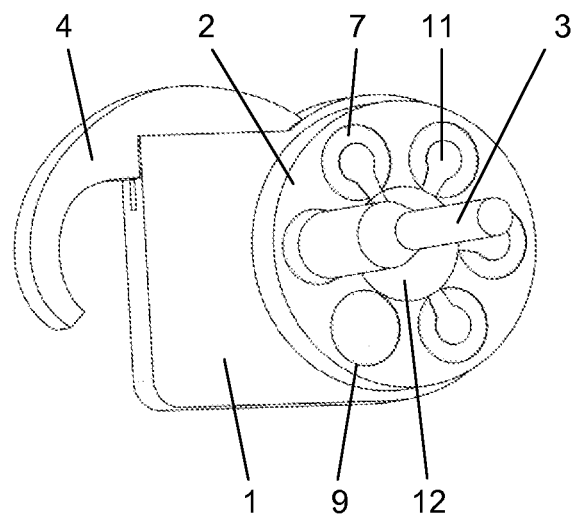
FIG. 1a shows an inventive battery exchange system with an inserted hearing device in perspective view.

FIG. 1a illustrates in a perspective view an embodiment of an inventive battery exchange system comprising a carrier module 1 (shown in a half-section representation in FIG. 1b), a battery dispensing module realised as a barrel type multi-battery cartridge 2 and a battery ejection means in the form of a push member 3. A hearing device 4 is shown fully inserted into a hearing device receiving means 5 (see FIGS. 4 & 5) implemented as a cavity within the carrier module 1. In this fully inserted position the battery receiving means, i.e. the battery compartment 6 of the hearing device 4 is open and accessible for inserting and/or removing a battery 7 into and/or from the battery compartment 6 via a cylindrical battery passage 8 (see FIG. 4) that traverses the carrier module 1 and intersects with the hearing device receiving means 5.

In this embodiment of the present invention six miniature cylindrical cell batteries 7 are individually held in separate battery retaining means, i.e. battery retainers 9 arranged along the circumference of the barrel type multi-battery cartridge 2 which is rotatably mounted with respect to the carrier module 1. Such a rotatable mounting may be achieved by means of a pivot (not visible in the figures) whose one end is fixedly attached to the multi-battery cartridge 2 and whose other end is adapted to be rotatably held within a centre bore 10 at the carrier module 1, e.g. via snap-fit. Conversely, the multi-battery cartridge 2 could be rotatably mounted within a housing of the battery dispensing module, which housing is attached to the carrier module 1. For this configuration a pivot extending from the housing of the battery dispensing module could be provided for engagement with a corresponding centre bore in the multi-battery cartridge 2. In either case rotatability of the multi-battery cartridge 2 allows to align any one of the plurality of batteries 7 in the multi-battery cartridge 2 with the battery passage 8 of the carrier module 1 and thus with the open battery compartment 6 of the hearing device 4. Cooperating detent means associated with the carrier module 1 or the housing of the battery dispensing module can be provided at the multi-battery cartridge 2 in order to accurately hold any one of the plurality of batteries 7 in alignment with the battery passage 8 of the carrier module 1 and thus with the open battery compartment 6 of the hearing device 4. Furthermore, a stop return means adapted to interact with the carrier module 1 or the housing of the battery dispensing module can be provided at the multi-battery cartridge 2 so that rotation of the cartridge is only possible in one direction. This ensures that rotation of the multi-battery cartridge 2 will bring the next battery retainer 9 containing a battery 7 into position for insertion of the battery 7 into the open battery compartment 6 of the hearing device 4.

Figure 1B:
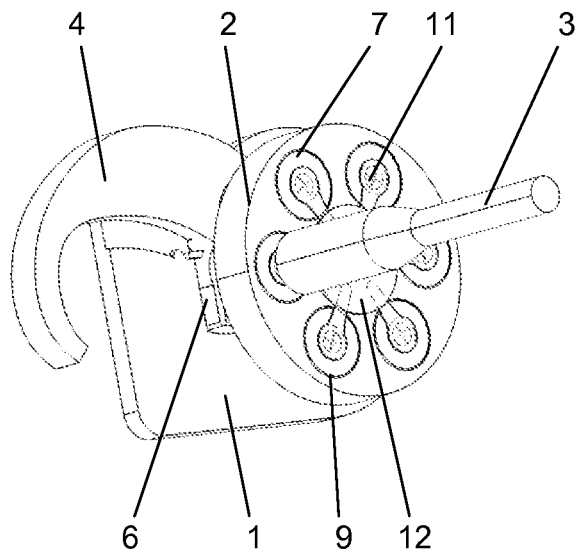
FIG. 1b shows an inventive battery exchange system of FIG. 1a with a half-section representation of a carrier module.

Each battery 7 is removably held within the corresponding battery retainer 9 by an appropriate battery holding means 11. The battery holding means 11 can be implemented as a clasp or a clamp gripping the cylindrical body of the battery. Alternatively, as illustrated in FIGS. 1a & 1b, an adhesive or magnetic tab 11 can be used as the battery holding means. Both embodiments can be employed alone or in combination. Adhesive "air tabs" are normally provided with zinc-air batteries for hearing devices. They must be removed from the surface of the battery in order to activate the battery. As shown in FIGS. 1a & 1b one end of the tabs 11 is attached to the multi-battery cartridge 2 by means of a tab fixation 12 for instance in the form of a round sticker.

Figure 2:
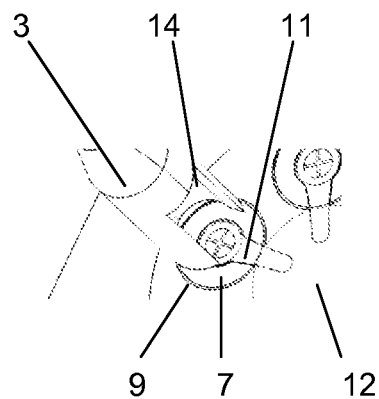
FIG. 2 shows in detail a perspective view of a part of an inventive battery exchange system, i.e. the front portion of a push member featuring a separation means for detaching a battery from a battery holder.

The battery 7 is detached from the battery holding means 11 by inserting the push member 3 into the battery retainer 9. This is illustrated in detail in FIG. 2, which shows a groove 14 extending along the front portion of the push member 3, wherein the profile of the groove is shaped essentially the same as and sized somewhat larger than the part of the tab 11 adhering to the battery 7. Correct alignment of the groove 14 with the battery holding means, e.g. the tap 11, for detaching the battery from the battery holding means can for instance be ensured by choosing mating axially asymmetric cross-sections (e.g. "egg-shaped" instead of circular) for the push member 3 and the battery retainer 9, such that the push member 3 can only be inserted into the battery retainer 9 when their cross-sections are correctly aligned to one another. By pushing the push member 3 against the battery 7, which is attached to the tab 11 by means of a pressure sensitive adhesive layer, the tab 11 is gradually peeled off and finally fully separated from the battery 7 as the push member 3 is inserted further and further into the battery retainer 9. The grove 14 ensures that the tab 11 is not cut apart and partially remains attached to the battery 7, but is fully retained at the multi-battery cartridge 2, i.e. by the tab fixation 12. Since the tab 11 holding the battery 7 is also the air tab of a zinc-air battery the inventive battery exchange system avoids direct handling of the air tabs and hence further simplifies and expedites the battery exchange process.

Figure 3:
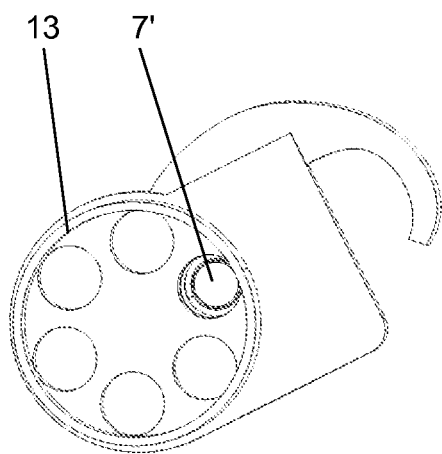
FIG. 3 shows an inventive battery exchange system with an inserted hearing device in perspective view from the opposite side relative to FIGS. 1a & 1b with a half-section representation of a battery disposing module.

FIG. 3 illustrates in perspective view from the opposite side relative to FIGS. 1a & 1b an embodiment of an inventive battery exchange system additionally comprising a battery disposing module 13 shown in a half-section representation.

As the push member 3 pushes the new battery 7 out of the battery retainer 9 the new battery engages with the battery compartment 6 of the hearing device 4 and thereby dislodges the battery 7' to be replaced from the battery compartment 6 and pushes the battery 7' to be replaced out of the carrier module 1 and into the battery disposing module 13 attached to the carrier module 1.

Figure 4:
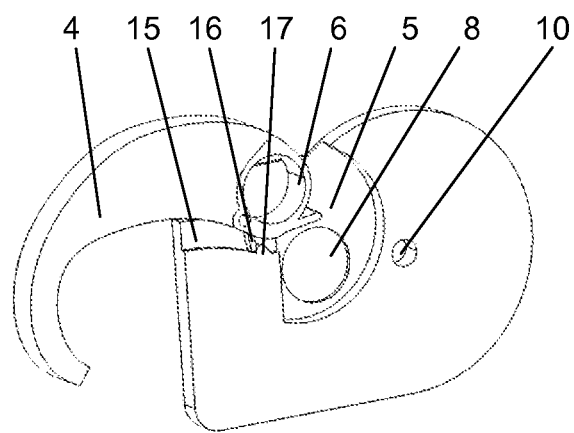
FIG. 4 shows a half-section representation of a carrier module of an inventive battery exchange system in perspective view with a hearing device half inserted into a hearing device receiving means, especially depicting an opening means for opening the battery compartment of the hearing device.

FIG. 4 illustrates in a perspective view a half-section representation of a carrier module 1 of an inventive battery exchange system with a hearing device 4 half inserted into a hearing device receiving means 5. The drawing especially depicts an opening means in the form of a guide channel 15 with protrusion 17 in cooperation with guide member 16 for opening the battery compartment 6 of the hearing device 4 as it is inserted into the hearing device receiving means 5. As can be seen, a guide member 16, which is associated with the battery compartment 6 of the hearing device 4, is introduced into a guide channel 15 of the carrier module 1 when the hearing device 4 is inserted into the hearing device receiving means 5 of the carrier module 1. The guide member 16 is preferably located close to the hinge of the battery compartment 6, so that small displacements of the guide member 16 will lead to significant movements of the battery compartment 6. Such displacements of the guide member 16 are effected by the course of the guide channel 15. Therefore, as the guide member 16 impinges on the protrusion 17 located at the far end of the guide channel 15 the guide member 16 is deflected, resulting in a rotation of the battery compartment 6 by approximately 90° about its hinge as the guide member 16 is conducted over the protrusion 17, thus bringing the battery compartment 6 into alignment with the battery passage 8 of the carrier module 1.

Figure 5:
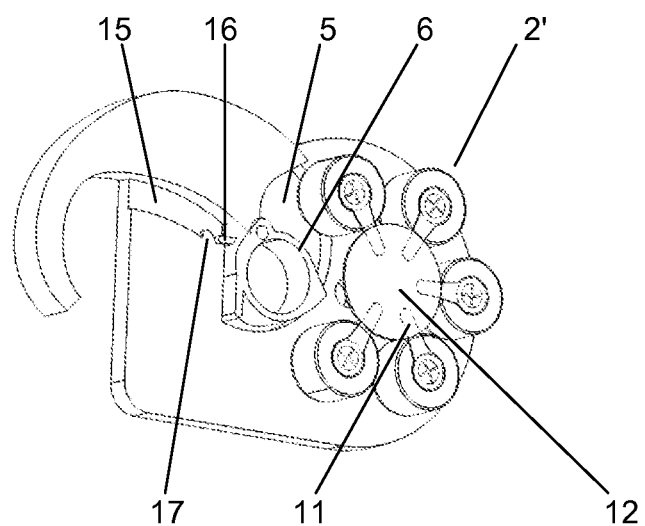
FIG. 5 shows an inventive battery exchange system in perspective view with a half-section representation of a carrier module depicting a fully opened battery compartment of a hearing device inserted into the carrier module.

An alternative, disk type embodiment 2' of the multi-battery cartridge is illustrated in FIG. 5 in a perspective view with the carrier module 1 shown in a half-section representation. The drawing depicts the hearing device 4 being fully inserted into the hearing device receiving means 5 with the battery compartment 6 in its fully opened position. Here the batteries 7 are not held within battery retainers 9 disposed along the circumference of a barrel, but the batteries 7 are held by tabs 11 that are attached to a circular disk along its perimeter. Likewise to the barrel type multi-battery cartridge 2 one end of the tabs 11 is attached to the disk type multi-battery cartridge 2' by means of a tab fixation 12 in the form of a round sticker.

Figure 6:
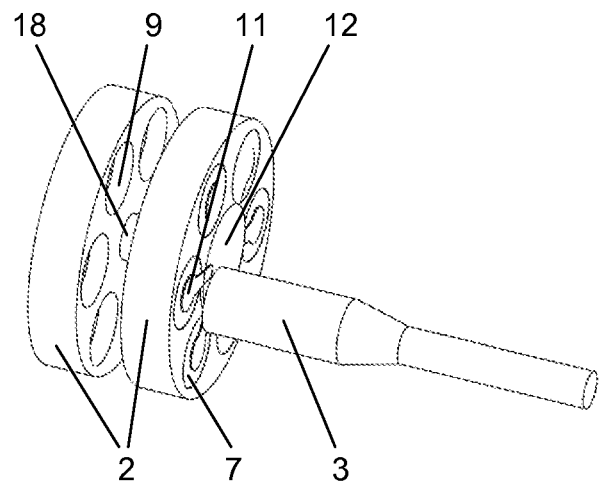
FIG. 6 shows an arrangement of two interconnected barrel type multi-battery cartridges representing an embodiment of the invention wherein the construction of the dispensing and the disposing battery modules is identical.

FIG. 6 shows an arrangement of two interconnected barrel type multi-battery cartridges 2 representing an embodiment of the invention wherein the construction of the dispensing and the disposing battery modules is identical. The interconnection between the two barrel type multi-battery cartridges 2 is in the form of an axle 18. One or both of the barrel type multi-battery cartridges 2 can be removably attached to the axle 18. In this way the axle 18 can be inserted into the centre bore 10 (see FIG. 4) after having removed at least one of the barrel type multi-battery cartridges 2 in order to attach the barrel type multi-battery cartridges 2 to the carrier module 1. Alternatively, if for instance the two barrel type multi-battery cartridges 2 including the interconnecting axle 18 are fixedly attached together, e.g. this entire arrangement consists of one piece, the axle could for example be introduced into the centre bore 10 via a flexible slot proceeding from an edge of the carrier module 1 to the centre bore 10.

LIST OF REFERENCE SIGNS 1 carrier module
2 barrel type multi-battery cartridge
2' disk type multi-battery cartridge
3 push member (battery ejection means)
4 hearing device
5 hearing device receiving means
6 battery receiving means, battery compartment
7 (rechargeable) battery (replacement battery)
7' (rechargeable) battery (to be replaced)
8 battery passage of the carrier module
9 battery retaining means, battery retainer
10 centre bore
11 tab (battery holding means)
12 tab fixation (sticker)
13 battery disposing module
14 groove (separation means)
15 guide channel
16 guide member
17 protrusion
18 axle (of battery modules)

What is claimed is:

1. A battery exchange system for hearing devices comprising:
a carrier module (1) featuring a hearing device receiving means (5) shaped to receive a part of a hearing device (4), wherein the part of the hearing device (4) to be received by the hearing device receiving means (5) at least comprises a battery receiving means (6); the carrier module (1) further featuring a battery passage (8), which traverses the carrier module (1) from a first opening at a first lateral surface to a second opening at a second lateral surface wherein the second lateral surface is opposite to the first lateral surface and the battery passage (8) of the carrier module (1) is arranged such that it intersects with the hearing device receiving means (5);
a battery dispensing module adapted to accommodate at least one battery (7), the battery dispensing module featuring a battery holding means adapted for releasably holding a battery (7) in or at the battery dispensing module, wherein the battery dispensing module is connected with the carrier module (1) such that the battery holding means is aligned or alignable with the battery passage (8) of the carrier module (1); and
a battery ejection means adapted to eject a battery (7) from the battery dispensing module into the battery passage (8) of the carrier module (1).

2. The battery exchange system according to claim 1, characterised in that the battery dispensing module is removably attachable to the carrier module (1).

3. The battery exchange system according to claim 1, characterised in that the battery dispensing module comprises a housing featuring a battery outlet and a further opening, wherein the housing is connected or connectable to the carrier module (1) such that the battery outlet is aligned with the battery passage (8) of the carrier module (1), and wherein the further opening is located on an exterior surface of the housing opposite to the battery outlet, whereby the further opening and the battery outlet form opposite ends of a battery passage that traverses the battery dispensing module.

4. The battery exchange system according to claim 3, characterised in that the battery ejection means comprises a push member (3) shaped to be insertable into the opening on the exterior surface of the housing and extendable through the battery passage of the battery dispensing module.

5. The battery exchange system according to claim 4, characterised in that the push member (3) is longitudinally movable within a tube from a refracted position to an extended position, wherein the tube is attached to the housing and aligned with the opening on the exterior surface of the housing such that the push member (3) is extendable through the battery passage of the battery dispensing module.

6. The battery exchange system according to claim 5, characterised in that a biasing means is provided in the tube for urging the push member (3) toward the retracted position.

7. The battery exchange system according to claim 1, characterised in that the battery holding means comprises a clasp or a clamp adapted to exert a gripping force on a battery (7).

8. The battery exchange system according to claim 1, characterised in that the battery holding means comprises an adhesive or magnetic tab (11), respectively, where a battery (7) is attachable to the tab (11) by means of a pressure sensitive adhesive layer applied to the tab (11) or by means of a magnetic element provided at the tab (11), respectively.

9. The battery exchange system according to claim 8, characterised in that the push member features a separation means adapted for detaching the attachable battery (7) from the tab (11) such that the tab (11) is retainable in the battery dispensing module.

10. The battery exchange system according to claim 9, characterised in that the separation means comprises a groove (14) extending along at least a portion of the push member (3) intended for insertion into the battery passage of the battery dispensing module, wherein the profile of the groove (14) is shaped essentially the same as and sized at least as large as a part of the tab (11) where a battery (7) is attachable.

11. The battery exchange system according to claim 1, characterised in that the battery dispensing module comprises a multi-battery cartridge (2, 2') rotatably mounted on the carrier module (1) or within the housing of the battery dispensing module, the multi-battery cartridge (2, 2') being adapted to retain a plurality of batteries (7).

12. The battery exchange system according to claim 11, characterised in that the multi-battery cartridge (2) comprises a barrel featuring a plurality of battery retaining means (9) each shaped to receive a battery (7), the plurality of battery retaining means (9) being arranged along the circumference of the barrel, wherein rotation of the barrel successively brings each of the battery retaining means (9) into alignment with the battery passage (8) of the carrier module (1).

13. The battery exchange system according to claim 11, characterised in that the multi-battery cartridge (2') comprises a disk featuring a plurality of battery holding means arranged along the perimeter, wherein rotation of the disk successively brings each of the battery holding means into alignment with the battery passage (8) of the carrier module (1).

14. The battery exchange system according to claim 12 or 13, respectively, characterised in that the multi-battery cartridge (2 or 2', respectively) comprises cooperating detent means associated with the carrier module (1) or the housing of the battery dispensing module adapted for holding in alignment any one of the plurality of battery retaining means (9) or the plurality of battery holding means, respectively, with the battery passage (8) of the carrier module (1).

15. The battery exchange system according to claim 11, characterised in that the multi-battery cartridge (2, 2') comprises a stop return means adapted for interaction with the carrier module (1) or the housing of the battery dispensing module such that the multi-battery cartridge (2, 2') is prevented from substantially rotating in one direction.

16. The battery exchange system according to claim 1, characterised in that the carrier module (1) comprises an opening means adapted for engaging with a hearing device (4) receivable by the hearing device receiving means (5) such that the battery receiving means (6) of the hearing device (4) is made accessible for exchanging a battery (7, 7') via the battery passage (8) of the carrier module (1).

17. The battery exchange system according to claim 16, characterised in that the opening means comprises a guide channel (15) shaped to receive a corresponding guide member (16) associated with the battery receiving means (6) of the hearing device (4) receivable by the hearing device receiving means (5), wherein the course of the guide channel (15) is adapted to generate a movement of the guide member (16) such that the battery receiving means (6) of the hearing device (4) is made accessible for exchanging a battery (7, 7') via the battery passage of the carrier module (1).

18. The battery exchange system according to claim 1, characterised in that the battery exchange system comprises a battery disposing module (13) adapted to accommodate at least one battery (7'), the battery disposing module (13) featuring a battery inlet, wherein the battery disposing module (13) is connected with the carrier module (1) such that the battery inlet is aligned with the battery passage (8) of the carrier module (1).

19. The battery exchange system according to claim 18, characterised in that the battery disposing module (13) is removably attachable to the carrier module (1).

20. The battery exchange system according to claim 18 or 19, characterised in that the construction of the battery disposing module (13) is identical to the construction of the battery dispensing module.

21. The battery exchange system according to claim 11, characterised in that the battery exchange system comprises a battery disposing module (13) adapted to accommodate at least one battery (7'), the battery disposing module (13) featuring a battery inlet, wherein the battery disposing module (13) is removably attachable to the carrier module (1) and the battery inlet is aligned with the battery passage (8) of the carrier module (1), and wherein the construction of the battery disposing module (13) is identical to the construction of the battery dispensing module, and wherein the multi-battery cartridge (2, 2') related to the battery dispensing module is rotatably coupled to the multi-battery cartridge (2, 2') related to the battery disposing module (13) by coupling means adapted to provide lock-step rotatability of the two multi-battery cartridges (2, 2').

22. The battery exchange system according to claim 18, characterised in that the battery disposing module (13) comprises a charging circuit for charging rechargeable batteries (7').

23. The battery exchange system according to claim 22, characterised in that the battery disposing module (13) comprises a battery charger as power source for charging depleted rechargeable batteries (7') via the charging circuit.

24. The battery exchange system according to claim 1, characterised in that the hearing device receiving means (5) is shaped to receive a part of a specific hearing device (4) model.

25. The battery exchange system according to claim 1, characterised in that the hearing device receiving means (5) is shaped according to certain features of an individual's ear.

26. The battery exchange system according to claim 1, characterised in that the carrier module (1) comprises two half-shells.

27. The battery exchange system according to claim 26, characterised in that the two half-shells are obtainable by means of injection moulding.

28. The battery exchange system according to claim 1, characterised in that the carrier module (1) is obtainable using a rapid prototyping process.

29. The battery exchange system according to claim 1, characterised in that the carrier module (1) features two hearing device receiving means (5), wherein one hearing device receiving means (5) is shaped to receive a part of a hearing device (4) specifically shaped to be worn at or in the left ear and the other hearing device receiving means (5) is shaped to receive a part of a hearing device (4) specifically shaped to be worn at or in the right ear.

30. A method for exchanging a battery (7, 7') of a hearing device (4) comprising steps of:
   i. inserting a hearing device (4) retaining a battery (7') to be replaced in a battery receiving means (6) of the hearing device (4) into a hearing device receiving means (5) of a carrier module (1) of a battery exchange system;
   ii. activating a battery ejection means of the battery exchange system, whereby the battery ejection means ejects a replacement battery (7) from a battery dispensing module attached to the carrier module (1) into a battery passage (8) that traverses the carrier module (1) and intersects with the hearing device receiving means (5), and whereby the replacement battery (7) is ejected into a part of the battery passage (8) of the carrier module (1) where the battery passage (8) intersects with the hearing device receiving means (5) such that the replacement battery (7) engages with the battery receiving means (6) of the hearing device (4), thereby dislodging the battery (7') to be replaced from the battery receiving means (6) of the hearing device (4), pushing the battery (7') to be replaced out of the carrier module (1) and thus removing the battery (7') to be exchanged from the battery exchange system; and
   iii. removing the hearing device (4) from the hearing device receiving means (5).

31. The method according to claim 30, characterised in that prior to step ii an opening means of the battery exchange system engages with the hearing device (4) inserted or being inserted into the hearing device receiving means (5) such that the battery receiving means (6) of the hearing device (4) is made accessible for exchanging the battery (7, 7') via the battery passage (8) of the carrier module (1).

* * * * *